Jan. 4, 1966    S. S. CURRIER    3,227,401
IN-FLIGHT CARGO PICK-UP DEVICE
Filed March 5, 1963    6 Sheets-Sheet 1

INVENTOR.
SUMNER S. CURRIER
BY Teller, McCormick, Paulding & Huber
ATTORNEYS

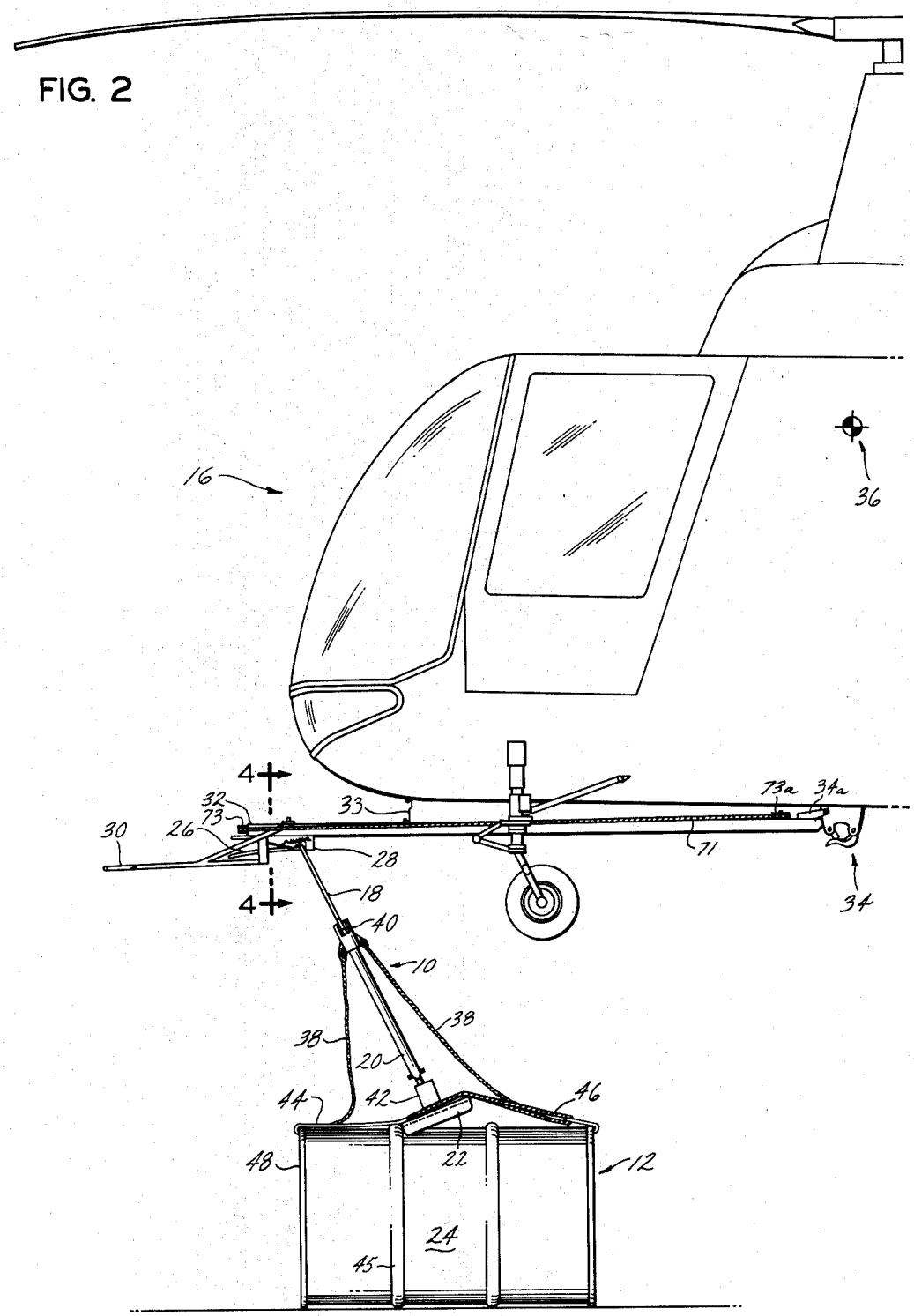

Jan. 4, 1966    S. S. CURRIER    3,227,401
IN-FLIGHT CARGO PICK-UP DEVICE
Filed March 5, 1963    6 Sheets-Sheet 3
FIG. 10
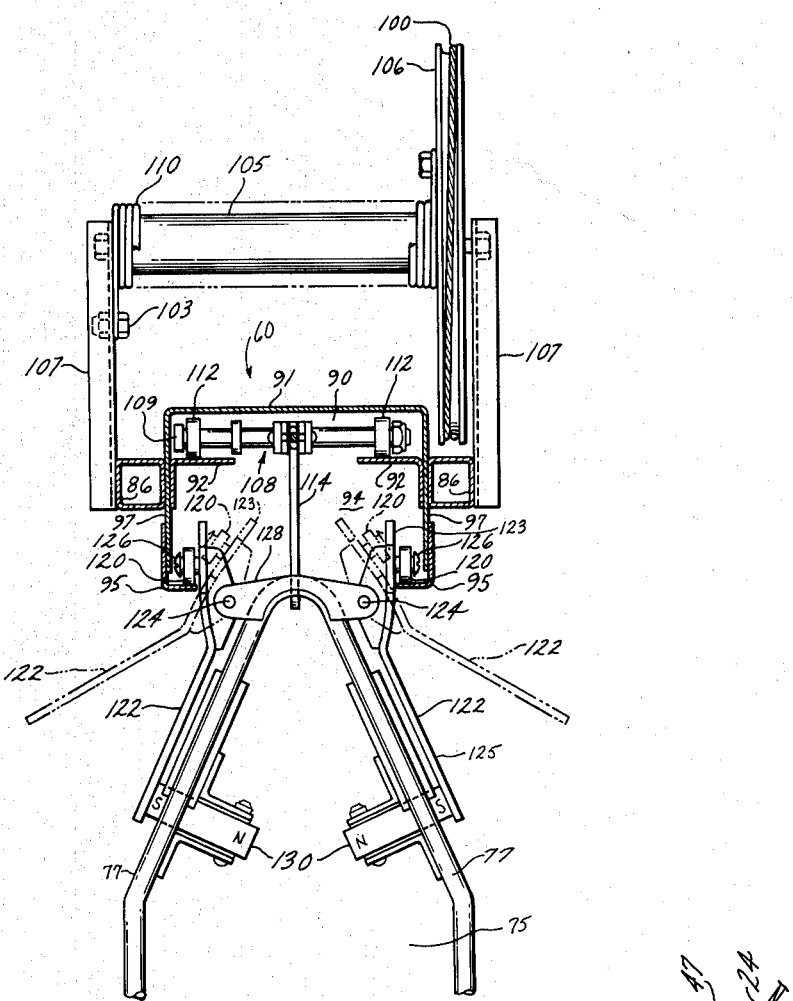
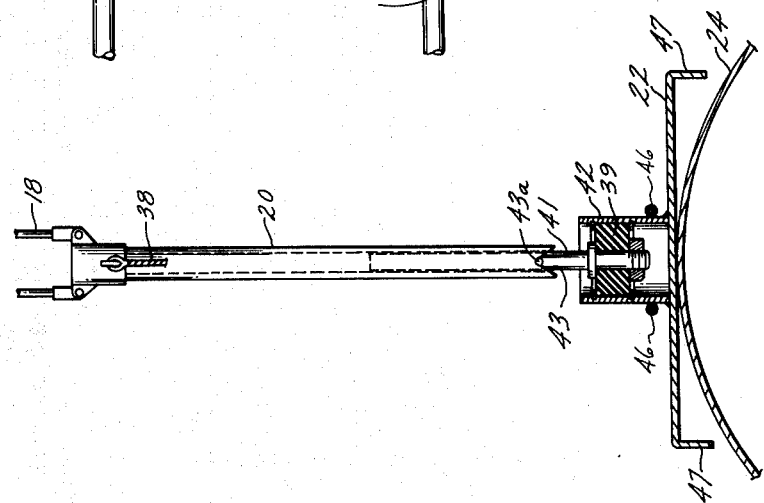

Jan. 4, 1966  S. S. CURRIER  3,227,401
IN-FLIGHT CARGO PICK-UP DEVICE
Filed March 5, 1963  6 Sheets-Sheet 4

Jan. 4, 1966    S. S. CURRIER    3,227,401
IN-FLIGHT CARGO PICK-UP DEVICE
Filed March 5, 1963    6 Sheets-Sheet 5

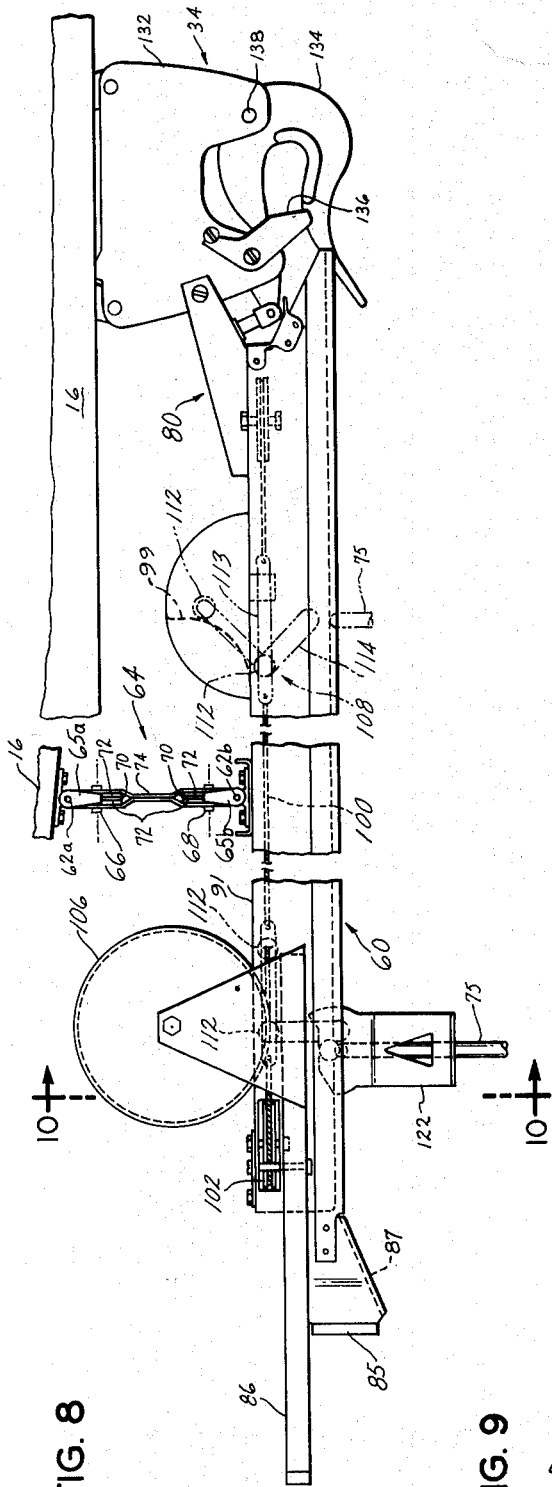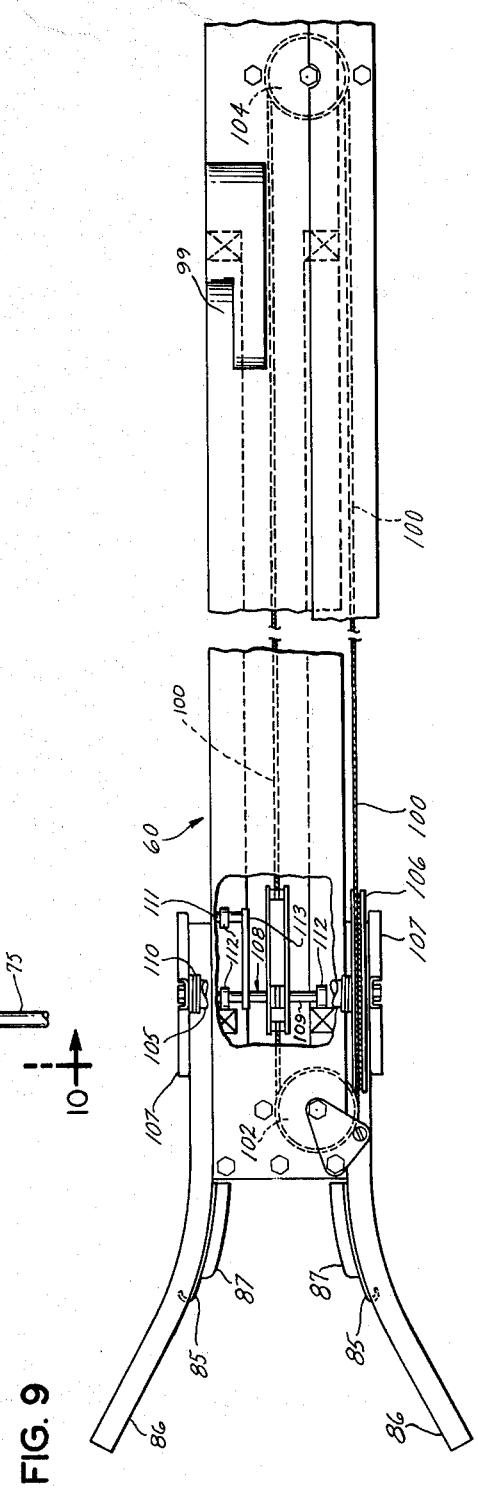
FIG. 8
FIG. 9

United States Patent Office 3,227,401
Patented Jan. 4, 1966

3,227,401
IN-FLIGHT CARGO PICK-UP DEVICE
Sumner S. Currier, Granby, Conn., assignor to Kaman Aircraft Corporation, Bloomfield, Conn., a corporation of Connecticut
Filed Mar. 5, 1963, Ser. No. 262,889
20 Claims. (Cl. 244—137)

This invention relates to devices for the picking up from the ground of a cargo bundle or the like by an aircraft in flight.

The general object of the present invention is to provide a cargo pick-up device which is operable by the pilot alone with no manual positioning of the cargo bundle or other ground assistance being required during an actual pick-up.

Another object is to provide a cargo pick-up device which can quickly be attached to an aircraft or removed therefrom and which device is also of simple lightweight construction which is inexpensive to fabricate and maintain.

Another object of the invention is to provide a cargo pick-up device having a target or the like on the cargo bundle and a target engaging means on a forward part of the aircraft, both of which members are visible to the pilot during the initial phase of the in-flight pick-up.

Another object of the invention is to provide a cargo pick-up device of the above character including means for automatically permitting the cargo lifting eye of the cargo bundle to move to a position generally below the center of gravity of the aircraft and into a cargo hook as the aircraft is flown forwardly.

Another object of the invention is to provide means for automatically dumping the cargo bundle in the event of excessive excursions of the aircraft during the time that the cargo lifting eye is being moved rearwardly relative to the aircraft to the cargo hook thereby preventing loss of control of the aircraft.

Another object of the invention is to provide a cargo pick-up device of the foregoing character utilizing a conventional cargo hook to serve as a means for supporting the cargo bundle generally below the aircraft center of gravity.

Another object of the present invention is to provide a cargo pick-up device of the foregoing character including a simple and reliable means for providing the pilot with a visual indication of the location of the cargo bundle relative to the aircraft after the bundle has passed out of his field of vision and before it reaches the cargo hook.

Other objects and advantages of the invention will be apparent from the description which follows and from the drawings forming a part thereof.

The drawings show two preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 2 is a side view showing the cargo bundle and helicopter of FIG. 1 during the initial phase of a pick-up operation.

FIG. 2a is a view partly in vertical section and partly in elevation showing the construction of the eye-supporting column and base, the parts being shown in the positions occupied in FIG. 1.

FIG. 8 is a side view showing the helicopter attached parts of the pick-up device shown in FIG. 7.

FIG. 9 is a top or plan view of the parts shown in FIG. 8.

FIG. 10 is an enlarged sectional view taken on the line 10—10 of FIG. 8.

Figure 1:
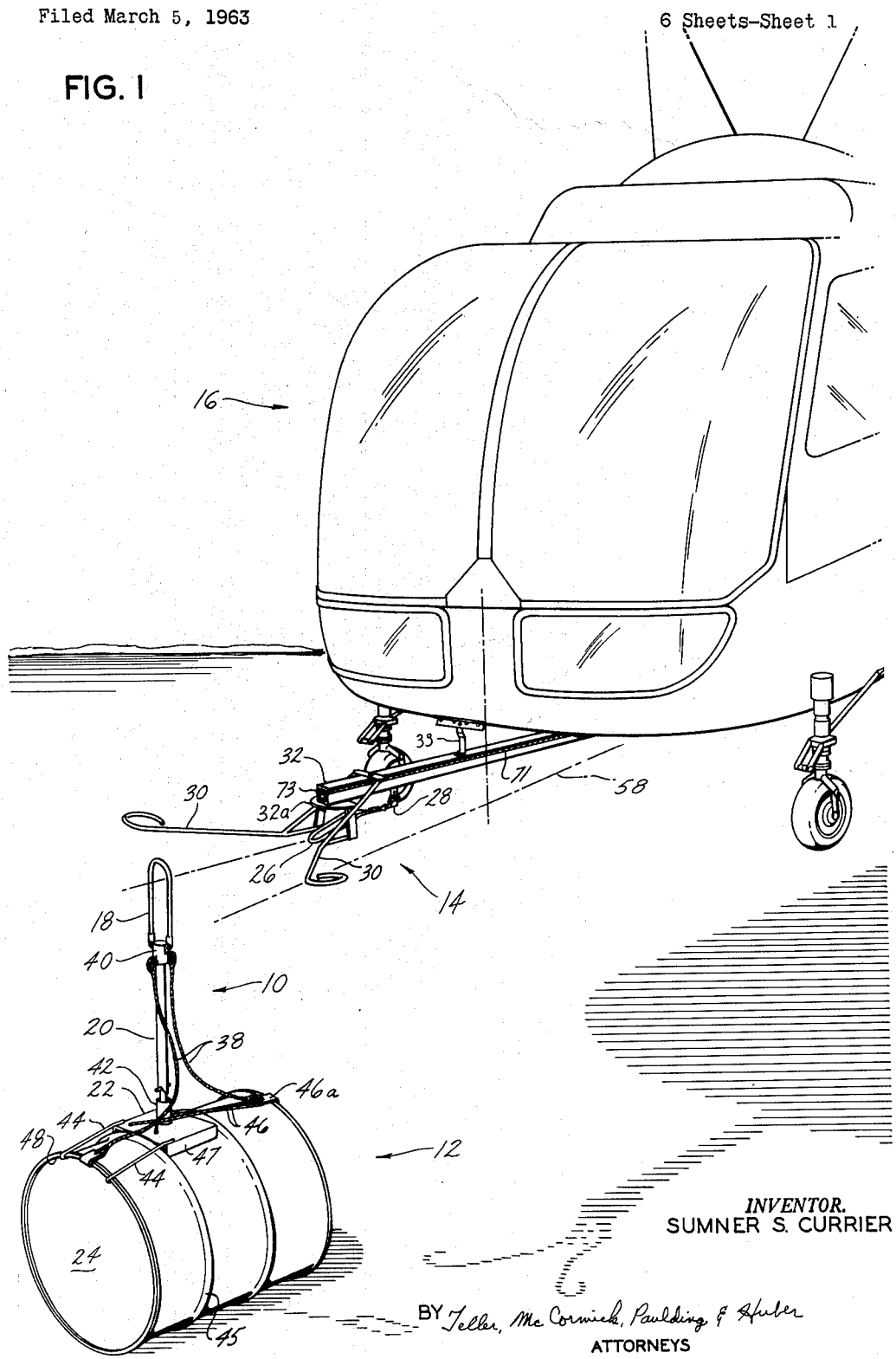
FIG. 1 is a perspective view showing a helicopter and a cargo bundle equipped with parts embodying the invention, this view showing the helicopter shortly prior to its engagement with the cargo bundle.

In accordance with the present invention there is provided a cargo pick-up device which is comprised essentially of two parts or assemblies. One part is adapted for attachment to a cargo bundle or the like indicated at 12 in the drawings and is referred to herein as the "target." The other part is adapted for attachment to an aircraft and is further adapted to engage the target and transfer the same rearwardly, from a position in front of the aircraft to a cargo hook located generally below the aircraft center of gravity, as the aircraft moves forwardly relative to the cargo. The device finds particular utility in connection with helicopters, and is herein described as attached to a helicopter 16, but may also be applied to any other type of aircraft capable of relatively slow speed flight.

One embodiment of the invention is shown in FIGS. 1 to 6 and includes a target 10 comprising a vertically elongated loop or cargo eye 18 attached to a support column 20 by a collar 40. This target is held in the vertical position illustrated in FIG. 1 by a base 22 attached to the cargo bundle which in the present instance is shown to consist of an oil drum 24.

Also included in the cargo pick-up device is a target engaging means indicated generally at 14, attached to the aircraft and which comprises a probe 26 carried by a trolley 28 that rides along a track 32 arranged generally longitudinally of the aircraft. On the forward end of the track is a guide means for guiding the cargo eye 18 into engagement with the probe. As shown this guide means includes two forwardly diverging guide arms 30, 30 attached to and extending outwardly from either side of the track. The track 32 extends rearwardly from the forward end shown in FIG. 1 to a cargo hook 34 located below the center of gravity 36 of the helicopter 16 as best shown in FIG. 2. The track is suspended externally beneath the helicopter and serves to carry the trolley 28 rearwardly along its length to the cargo hook 34. At its rear end the track is fixed to the body of the cargo hook 34 by a bracket 34a and near its forward end is connected to the fuselage of the helicopter by a strap hanger 33. The cargo hook is supported by conventional means (not shown) for pivotal movement about an axis extending longitudinally of the aircraft and the strap hanger 33 is similarly capable of pivotal movement relative to the aircraft and to the track at its upper and lower ends respectively. The hanger 33 may, for example, be similar in construction to the hanger 64 described in more detail hereinafter in connection with another embodiment of the invention. The track 32 is therefore capable of swinging laterally relatively to the aircraft and will therefore be gravity biased into the optimum position for effecting pick-up despite the fact the aircraft may be rolled slightly to one side or the other of its normal attitude.

The cargo bundle 12 is supported in flight by a sling comprised by two cables 38, 38 each of which is attached at one end to the collar 40 and at its other end to the drum as shown. The column 20 is normally in an upright position relative to the base and is adapted for vertical telescoping movement relative to the base. When the cargo is resting on the ground, as shown in FIG. 1, the column is in a collapsed or retracted condition so that the cables 38, 38 are slack. The base 22 is attached to the drum 24 in such a manner as to permit the top of the column and eye 18 to be deflected or tilted forwardly and/or laterally from the upright position to a position such as shown, for example, in FIG. 2. The means for so attaching the base to the drum in the present case includes two elongated flexible metal rods or similar members 44, 44 each of which is welded or otherwise fixed at its rear end to the base 22 and extends forwardly from the base and has a hook on its forward end which hooks around the rim or chime 48 of the drum. Also associated with the base are two bungees 46, 46 each of which, as shown best in FIG. 1, is attached at its forward end to the base near a respective forward corner thereof, is passed along the far side of the socket 42, and is attached at its rear end, under a slight amount of tension, to the rear rim of the drum by a suitable hook 46a. The bungees thus serve to resiliently resist tiltting and forward movement of the base.

As shown in FIGS. 1 and 2 the length of the rods 44, 44 is such that the forward end of the base is located just slightly behind the forward rib 45. The base is made of flat sheet or plate material and along each lateral edge is bent downwardly to provide a flange 47. The width or depth of these flanges 47, 47 is such that the lower edge of each is spaced some distance from the outer surface of the drum when in the normal position shown in FIG. 1. The column 20 is therefore movable laterally in either direction from the FIG. 1 position by rolling movement of the base relative to the drum. Some of this rolling movement is resisted by the bungee 46, but the major portion is resisted by flexing the rods 44, 44 which tend to return the column 20 to its upright position. When the column 20 is tilted forwardly, as shown in FIG. 2, the rear end of the base 22 is lifted from the drum and both the bungee 46 and the rods 44, 44 are flexed so as to tend to return the column and base to their normal positions.

FIG. 2a is a vertical section through the base 22 and shows the manner in which the column 20 is telescopically connected with the base. Welded or otherwise fixed to the top of the base is a socket member 42 in the form of a short piece of tubing which has fixed in its base a flexible rubber mounting member 39. The mounting member in turn supports a vertical rod 41 which extends upwardly into the bore of the column 20, the latter being tubular. The rod 41 and the bore of the column 20 are so dimensioned that the column may slide freely relatively to the rod. At its lower end the column 20 is provided with a V-shaped mouth or slot 43 which is engageable with a transverse pin 43a fixed to the rod 41 to limit the downward or retracting movement of the column relative to the rod. The amount of slack in the cables 38, 38 is also such that it will be completely taken up to prevent further further upward movement of the column relative to the rod 41 before the top of the rod reaches the bottom of the column and therefore the column cannot be completely removed from the rod. The engagement of the pin 43a with the mouth 43 also serves to angularly align the column relative to the rod 41 and base 22 to properly position the eye 18 relative to the cargo bundle. This is important since the pilot of the aircraft should approach the cargo heading into the wind. If the cargo bundle is initially placed on the ground so as to allow this type of approach the pin 43a and mouth 43 will retain the eye 18 in the proper position and prevent it from rotating relative to the cargo prior to pick-up. Also, if the pick-up is not completed on the first or subsequent passes, the engagement of the mouth with the pin as the column slides back to its retracted position will serve to automatically realign the column relative to the cargo to bring the eye 18 back to its initial optimum position for another attempt at a pick-up from the downwind direction. It should also be noted that the flexibility of the rubber mounting member 39 allows some resilient tilting of the column 20 relative to the base 22 and thereby alleviates the side loads exerted between the column and rod 41 which otherwise could possibly result in binding of the latter two parts and thereby prevent the desired telescoping movement.

After the cargo eye 18 is positioned in the helicopter's cargo hook 34, and as the helicopter rises, the column 20 telescopes or slides upwardly relatively to the rod 41 until the cables 38, 38 become tight. Thereafter, as the helicopter continues to rise the load is transferred to the cables until the cargo is eventually supported and lifted from the ground by the latter.

Figure 4:
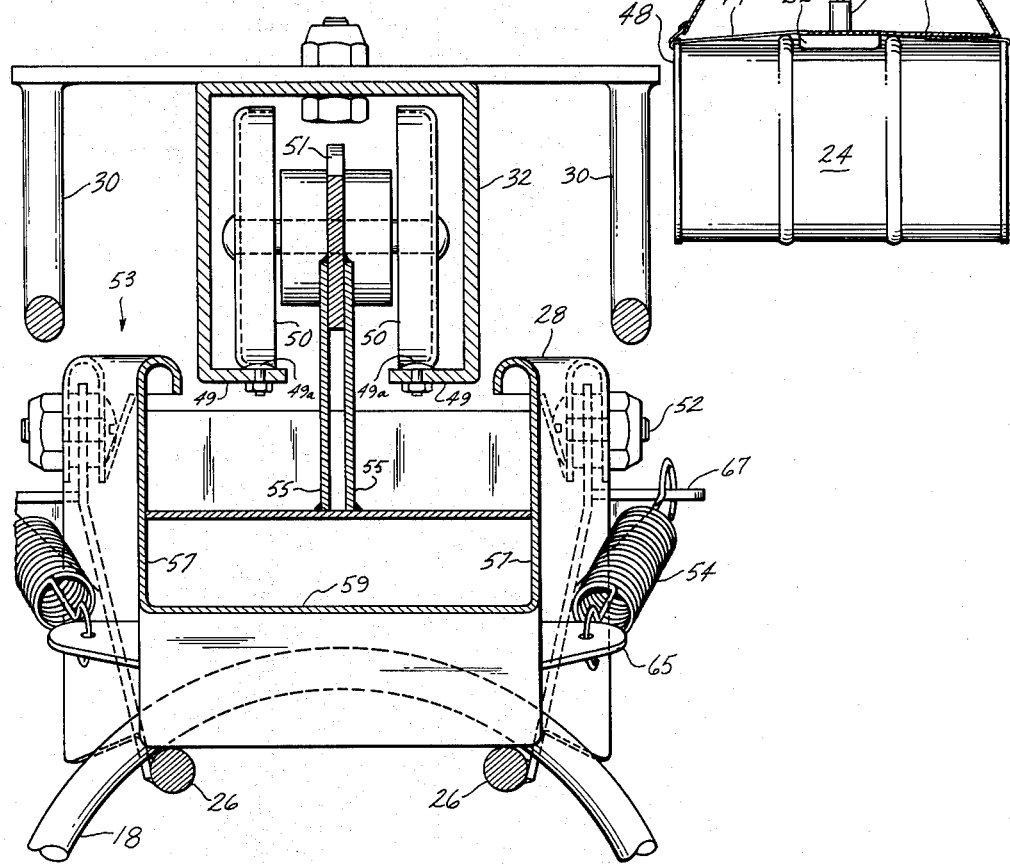
FIG. 4 is an enlarged sectional view taken along the line 4—4 of FIG. 2 and showing the construction of the trolley mounted on the helicopter.
Figure 5:
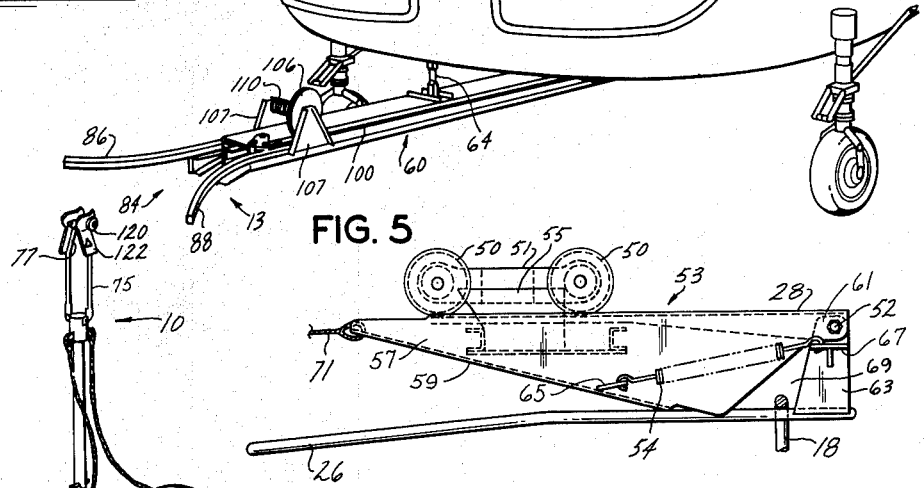
FIG. 5 is a side elevational view of the trolley shown in FIG. 4, this view being drawn on a scale larger than that of FIG. 2 but smaller than that of FIG. 4.
Figure 6:
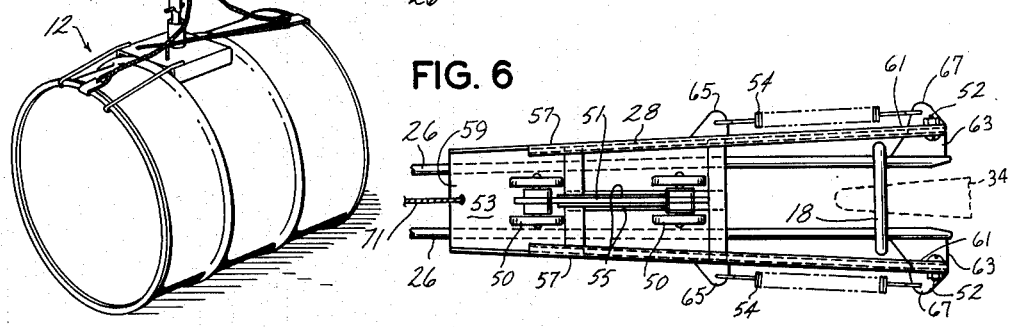
FIG. 6 is a top or plan view of the trolley shown in FIG. 5.

FIGS. 4, 5 and 6 illustrate in greater detail the construction of the parts of the invention which are attached to the aircraft. Referring to these figures, the track 32 is channel shaped in cross section and has two laterally spaced and longitudinally extending bottom flanges 49, 49. The trolley 28 has two pairs of wheels 50, 50 which are received in the track and which normally ride on the bottom flanges 49, 49. The two pairs of wheels are connected by a longitudinal extending member 51. A body 53 is attached to the member 51 by two plates 55, 55 which extend through the bottom opening in the track. The body 53 has two laterally spaced and forwardly converging side walls 57, 57 and as shown best in FIG. 5, at its forward portion includes a forwardly and upwardly inclined bottom wall 59 which forms an acute angle with the forward portion of the probe 26 to define a V-shaped throat for receiving the cargo eye and for guiding the same to the rear of the trolley. At its rear portion each side wall 57 defines a rearwardly extending arm 61 located some distance above the probe.

As best shown in FIGS. 1 and 6 the probe 26 comprises a member shaped in the form of a U and arranged with its open end facing rearwardly. The rear end of the probe is pivotally supported from the trolley body 53 for movement about a transverse axis by two connecting plates 63, 63 each of which is welded at its lower end to a respective one of the arms of the probe and at its upper end pivotally connected to a respective one of the body arms 61, 61 by a bolt 52. The probe is normally held in the generally horizontal position shown in FIG. 5 by two helical tension springs 54, 54 located on opposite sides of the body and each of which is stretched between a tab 65 fixed to the body and a tab 67 fixed to the associated plate 63. At the rear of the trolley the side walls 57, 57, the probe 26 and the plates 63, 63 define a pocket 69 which receives and holds the cargo eye 18 as the trolley travels rearwardly to the cargo hook. As viewed from above in FIG. 6 it will be readily noted that the construction of the trolley is such that at its rear portion, or in the vicinity of the pocket 69, it is open or U-shaped so as to be capable of receiving all or at least part of the cargo hook 34, indicated by the broken lines in FIG. 6, between the arms of the probe and the trolley side walls. It should also be noted that, as shown in FIG. 2, the track 32 extends only to the forward edge of the cargo hook 34 and that the wheels 50, 50 are located adjacent the forward portion of the trolley body as best shown in FIG. 5. Therefore when the wheels reach the rearward limit of their travel the rear portions of the trolley and the cargo eye will be positioned rearwardly beyond the rear end of the track to bring the cargo eye into the cargo hook.

As mentioned, the probe 26 is supported for pivotal movement relative to the body of the trolley and is normally biased to the horizontal position shown in FIG. 5 whereat it engages the rear edge of the inclined wall 59. The ability of the probe to pivot relative to the body allows the cargo eye to pass under said rear edge into the pocket 69 during the initial phase of pick-up operation. The same pivoting ability also acts as a safety release during the time the trolley is moved rearwardly along the track to the cargo hook. Thus, in the event of a sudden gust or other disturbance which moves the aircraft in such a manner as to tend to pick-up the load before the cargo eye reaches the cargo hook, the load will overcome the force of the springs 54, 54 and the probe will pivot downwardly, or counterclockwise as viewed in FIG. 5, to allow the cargo eye to slide out of engagement therewith.

The track 32 extends forwardly beyond the front end of the fuselage so that when the trolley is in its forward position it is within the field of vision of the pilot thereby making it possible for the pilot, by observing the target and the probe or trolley, to maneuver the aircraft to bring the target into proper engagement with the probe. To further increase the pilot's visual contact with the initial phase of the pick-up operation, the track is also preferably disposed at an angle to the longitudinal center line 58 of the helicopter so as to extend forwardly from a position directly below the pilot who normally sits to one side of said center line.

The trolley is biased toward the forward end of the track 32 to the position shown in FIG. 1 by a suitable means which in the illustrated case constitutes a bungee or elastic cord 71 tied at one end of the trolley, passed over a front pulley 73 at the forward end of the track 32, passed over another pulley 73a at the rear of the track, and tied at its other end to the track at a point near the forward end thereof. The trolley is also held in the forward position by a detent which as shown in FIG. 4 may comprise two bolts 49a, 49a with rounded heads. These bolts are fastened respectively to the flanges 49, 49 of the track 32 so that the rounded heads lie in the path of the wheels 50, 50 and are disposed between the forward and rearward wheels when the trolley is in its forward position. The bolts therefore resist rearward movement of the trolley until sufficient force is applied to the trolley to cause the forward wheels to ride over the rounded heads. The force required to overcome the detent action of the bolt heads is not great, but is nevertheless sufficient to cause the probe to pivot against the action of the springs 54, 54, to allow the cargo eye to enter the pocket 69, before the trolley is moved from its forward position. The presence of the detent also allows the bungee 71 to be fairly lightly loaded so that after release of the cargo from the cargo hook the trolley is returned along the track at a relatively slow rate sufficient to avoid structural damage.

The operation of the pick-up device of FIGS. 1 to 6 may now be briefly described as follows. With the target attached to the cargo and in its upright position, the pilot of the helicopter maneuvers the latter to bring the probe 26 into engagement with the cargo eye 18, the trolley 28 and probe 26 being at this time located at the forward end of the track 32 by the bungee 71 and clearly within the sight of the pilot. The probe is intended to pass through the eye 18 and the accomplishment of this is facilitated by the diverging guide arms 30, 30 which are adapted to engage the cargo eye to rock the same to one side or the other to properly align the eye with the probe as the helicopter moves forwardly. Also the eye 18, preferably and as shown, is vertically elongated to allow the pilot some latitude in regard to the height at which the probe strikes the eye. If the probe enters the upper portion of the eye the eye thereafter is moved into the pocket 69 without any tilting or deflection of the support column 20. Should the probe however enter a lower portion of the eye, the continued forward motion of the helicopter will push the support column 20 forwardly to a deflected position such as shown in FIG. 2 until the upper portion of the eye is lowered to the point at which it may enter the pocket 69. That is, the ability of the target to deflect as shown in FIG. 2 permits proper engagement with the cargo to be made at various different heights of the helicopter from the ground, thereby eliminating the need for very precise maneuvering. On the forward end of the track is a semi-circular guard plate 32a which prevents the cargo eye from becoming caught on the track when the probe approaches the lower portion of the eye.

Figure 3:
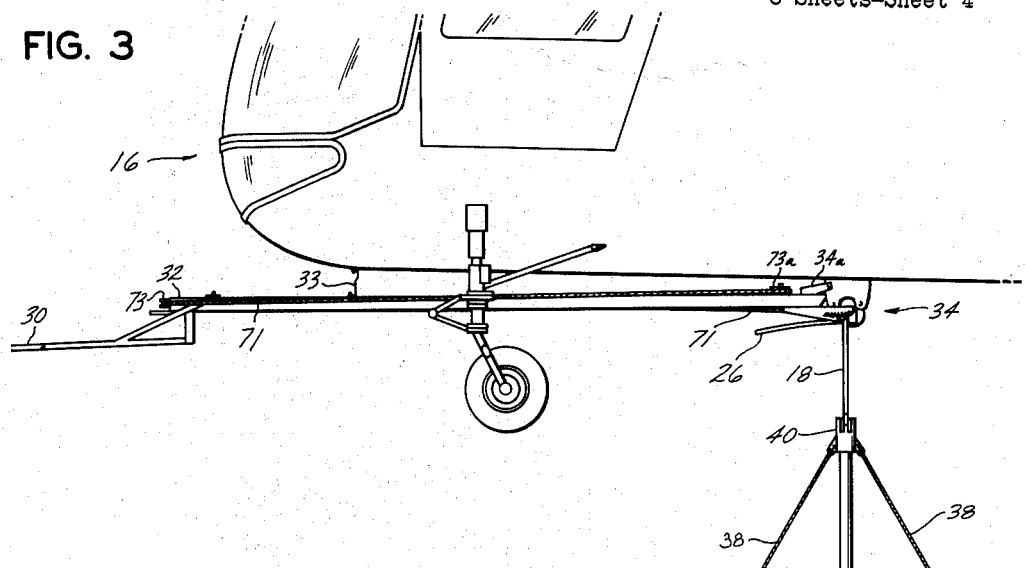
FIG. 3 is a side view similar to FIG. 2 but showing the cargo bundle as carried in flight.

After the probe is engaged with, or inserted into, the cargo eye the helicopter is flown forwardly relative to the cargo. This first causes the cargo eye to be moved rearwardly into the throat of the trolley and to eventually cause it to cam or pivot the probe downwardly to allow the eye to pass into the pocket 69. Continued forward movement of the helicopter then moves the trolley rearwardly along the track until the cargo eye is received in the cargo hook. The helicopter is then raised and the load lifted as shown in FIG. 3.

Another embodiment of the invention is shown in FIGS. 7 to 10. Referring to these figures, the embodiment shown therein is in many respects similar to that of FIGS. 1 to 6, but differs in that the trolley is omitted from the helicopter and instead wheels, or other means for guiding the cargo eye along the length of the track, are attached directly to the cargo eye. Also the latter embodiment additionally includes an indicating means for providing the pilot with a visual indication as to the location of the cargo eye relative to the helicopter.

Figure 7:
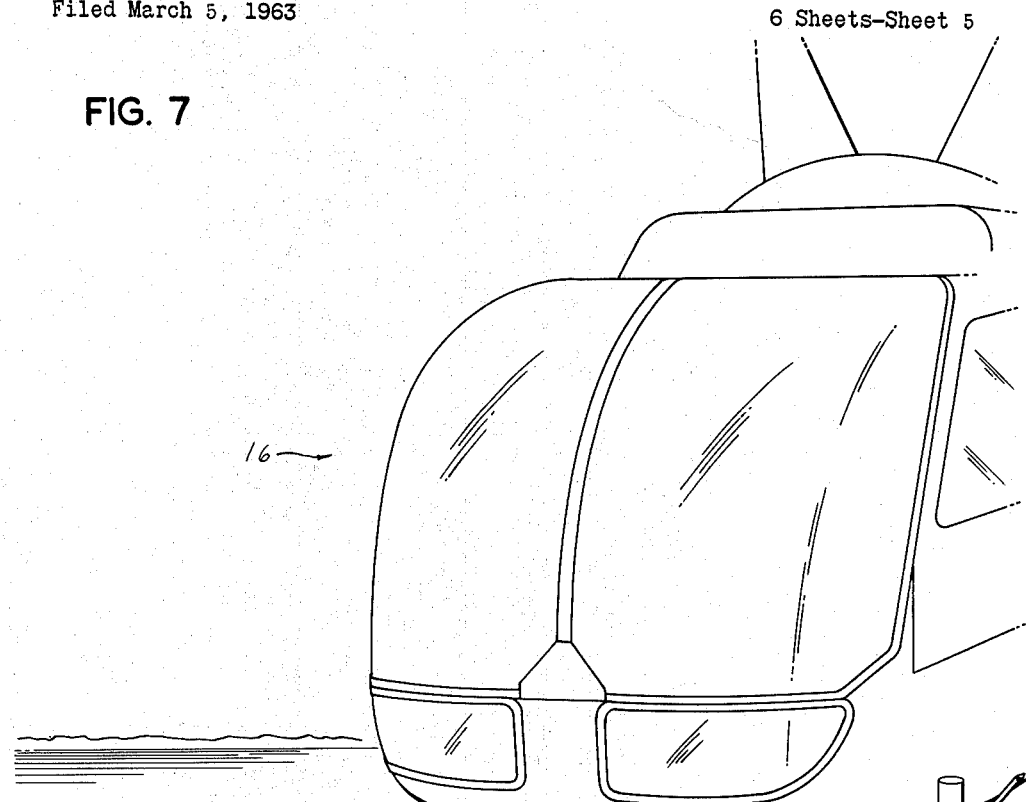
FIG. 7 is a perspective view generally similar to FIG. 1 but showing the helicopter and cargo bundle equipped with parts comprising another embodiment of the invention.

As in the first embodiment, a target 10 is provided and is suitably attached to a cargo bundle. Except for the cargo eye provided on the target, the illustrated target is identical with the target of FIGS. 1 and 2 and need not be redescribed. Referring to FIGS. 7 and 10 the cargo eye is shown at 75 and at its upper portion is shaped to define two relatively straight and upwardly converging portions 77, 77. At the upper end of the eye, or at the apex of the portions 77, 77, is a bracket 128 which is welded or otherwise fixed to the eye. The bracket includes two laterally outwardly extending arms, and each arm supports a member 122 pivotally connected to the arm as at 124. The member 122 in turn has one portion 123 which extends generally upwardly from the axis 124 and another portion 125 which extends generally downwardly from the axis 124 and parallel to the associated eye portion 77. Each upper portion 123 has fixed thereto a stud 126 which rotatably supports a wheel 120. The normal positions of the two members 122 are shown by the full lines of FIG. 10, and when the members are in such normal positions the axes of the two wheels are substantially colinear. The members 122, 122 are held in their normal position by two magnets 130, 130 suitably attached to the cargo eye as shown and each having a pole face adapted to magnetically attract and hold the lower end of the lower portion 125 of the associated member 122.

Referring now to FIGS. 7 and 8, a generally horizontally arranged track 60 is suspended beneath the aircraft 16 and is attached thereto at two points. At the forward attachment point the connection is made by means of a strap hanger shown generally at 64, and at the rear attachment point the track is connected directly to the cargo hook 34 by a suitable bracket indicated generally at 80. The cargo hook 34 is attached at its upper end to the aircraft fuselage in a conventional manner for rotation relative to the fuselage about an axis extending longitudinally of the latter. Also, the hanger 64 is adapted, as described below, to allow the track to swing laterally relative to the fuselage. By this means the track is made to hang truly vertically from the fuselage despite the fact that the fuselage may be rolled to one side or the other of its normal attitude.

Although it is desirable that the track be suspended from the fuselage as above described in order that it hang vertically from the fuselage, it is also desirable that lateral swinging motion of the track be inhibited, and for this purpose the strap hanger 64 includes a friction damping means. Referring particularly to FIG. 8, the hanger 64 includes a U-shaped strap 65a pivotally connected to the fuselage for rotation about a transverse axis 62a and another similar strap 65b pivotally connected to the track for rotation about a transverse axis 62b. Fixed to each strap is a center disc 70 and on either side of each center disc is a friction disc 72. Extending between the two sets of discs is a strap 74 which is forked at both ends to provide two arms or discs which straddle the discs 72, 72 and 70. The upper set of discs is held assembled by a bolt or the like 66 which holds the various discs in frictional engagement with each other and serves as a pivot pin. The frictional engagement of the discs 72, 72 with the disc 70 and with the arms of the strap 74 therefore frictionally restrains movement of the strap 74 relative to the strap 65a about the axis of the bolt 66. The lower set of discs are similarly held assembled by a bolt 68. Pivotal movement of the straps 65a and 65b about the transverse axes 62a and 62b is provided in order to accommodate the track being inclined relative to the longitudinal center line of the fuselage.

Turning to FIG. 10, the track 60 is channel-shaped in cross section and includes upper and lower longitudinal passageways 90 and 94. The track 60 also at its forward end includes a means for guiding the wheels 120, 120 of the cargo eye into the lower passageway of the track. As shown, this guide means comprises horizontally extending guide bars 86, 86 attached at their aft ends to the track 60. These guide bars widen laterally as they extend forwardly forming a funnel-shaped opening adapted to receive the cargo eye. Also comprising part of the guide means are two side pieces 85, 85 attached to the guide bars adjacent the mouth of the track and each of which side pieces includes a laterally inwardly extending and rearwardly upwardly inclined flange 87 for engaging and guiding the wheels into the lower passageway 94. The upper passageway 90 is formed by the top portion 91 of the track and the laterally inwardly extending flanges 92, 92 of two right angle brackets attached to the side walls 97, 97 of the track. The lower passageway 94 is formed by the bracket flanges 92, 92 and by the laterally inwardly extending flanges 95, 95 of two other brackets attached to the lower edge portions of the channel walls 97, 97. The latter passageway is adapted to receive the wheels 120, 120 which are mounted on the cargo eye while the upper opening serves to house various components of an indicating device for telling the pilot where the cargo eye is located along the track 60.

The indicating device includes a continuous cable 100 which is wound about two pulleys 102, 104 located one at either end of the track 60. On one side of the loop thus formed the cable is located outside of the track and is passed around a drum 106 located close to the forward pulley 102 so that both the drum and the cable thereon are visible to the pilot. The other side of the cable loop is located at about the transverse middle of the track within the upper passageway 90 and is attached to a three-wheel indicator carriage 108. The drum 106 is fixed to a hub 105 which is rotatably supported from the track by two laterally spaced support members 107, 107, and the carriage 108 is biased to the forward end of the track 60 by a helically wound spring 110 surrounding the hub 105. That is, the spring tends to rotate the drum 106 in such a direction as to cause the cable 100 to pull the carriage to the forward end of the track and to yieldingly resist its movement to the rear end of the track.

The carriage 108 itself comprises a transversely extending axle 109 having a roller 112 rotatably supported on each end. Fixed to one side of the axle is a rearwardly extending arm 113 having a short axle fixed thereto which axle rotatably supports a third roller 112. One roller 112 thus travels along one flange 92 and the other two rollers 112, 112 travel along the other flange 92. Also fixed to the axle 109 is a depending arm 114 which is of such length as to extend into the lower passageway 94 and be engageable by the cargo eye 75. Thus, after the wheels 120, 120 enter the track the cargo eye engages the arm 114, and as the eye moves rearwardly it carries with it the carriage 108. Since the bias spring 110 exerts a force on the upper portion of the carriage tending to pull it forwardly and since the cargo eye exerts a force on the lower portion of the arm 114 tending to move it rearwardly, a torque is imposed on the carriage tending to rotate the same about the axle 109 and in such a direction as to raise the rear wheel 112 and cause it to roll against the top portion 91 of the track. Near the rear end of the track the top portion 91 is cut away along the path of travel of the rear wheel 112 and is replaced by an upwardly curved portion indicated at 99. Therefore, when the rear wheel reaches the curved portion 99, it travels upwardly to the position shown by the broken lines in FIG. 8, thereby rotating the axle 109 and swinging the arm 114 upwardly to allow the cargo eye to pass rearwardly beyond the carriage and into the cargo hook. After the arm 114 is so disengaged from the cargo eye, its bias spring 110 returns the carriage to the forward end of the track.

As the indicator carriage is carried rearwardly by the cargo eye, the cable 100 travels over the drum 106 and therefore by color coating or otherwise marking sections of the cable 100 the position of the cargo eye along the track 60 can be readily ascertained by visual reference to the particular cable section located on the drum 106. For example, sections of the cable may be so colored that when the indicator carriage is located at or near its forward position the cable located on the drum is colored green, when the carriage is located intermediate its two end positions the cable located on the drum is colored yellow, and as the carriage nears the broken line position shown in FIG. 8 the cable located on the drum is colored red. Other colors or markings may also be added to provide more precise information.

Returning to FIG. 10, the second embodiment of the invention also includes a means for automatically releasing the cargo in the event the aircraft undergoes an unexpected lifting movement after engagement is made with the cargo eye but before the latter reaches the cargo hook. In this instance the release means includes the magnets 130, 130 and the pivotal members 122, 122 which carry the wheels 120, 120. Normally the magnets hold the members in the full line positions shown whereat the wheels 120, 120 are engageable with the track flanges 95, 95 in the usual manner for retaining the cargo eye in guided relationship with the track. It should be noted, however, that the wheels 120, 120 do not necessarily engage and roll along the flanges 95, 95 but that depending on the height of the aircraft from the ground the wheels may be otherwise located in the passageway 94 than shown, the primary purpose of the flanges being to retain the wheels in the passageway. If the aircraft does raise relative to the cargo, however, the wheels will bear against the flanges 95, 95 and if the lifting force so transmitted becomes too great the torque produced about one or both of the pivot axes 124, 124 will be sufficient to move one or both of the associated arms 125, 125 away from the magnets to the broken line positions of FIG. 10, thereby moving the wheels 120, 120 to such positions as to allow them to pass through the bottom opening of the track and free of the aircraft. By properly selecting the strength of the magnets and the relative lengths of the arms 123 and 125 this release means may be made to automatically effect release at any desired load.

The cargo hook 34, shown in detail in FIG. 8, is of conventional construction and includes a body 132, a hook member 134 and a pawl 136. The hook member is normally held in the position shown, but is pivoted to the body for movement about an axis 138 to release the cargo eye, such movement being under the control of the pilot. The hook also preferably includes a microswitch or the like and an associated indicating circuit for providing the pilot with an indication when the pawl 136 is tripped by the cargo eye entering the hook member.

The invention claimed is:

1. An in-flight cargo pick-up device for use with an aircraft having an external cargo hook located at a position substantially fixed relative to said aircraft and out of the field of vision of the pilot and with a cargo bundle equipped with a target adapted to be received by said cargo hook, said device comprising an elongated track located externally of said aircraft and extending generally longitudinally thereof from said cargo hook to a forward position within the field of vision of the pilot, and guide means engageable with said target and with said track for restraining movement of said target to movement longitudinally of said track so that said target is captively guided into said cargo hook as said aircraft moves forwardly relative to said cargo bundle.

2. An in-flight cargo pick-up device for use with an aircraft having an external cargo hook or the like and with a cargo bundle equipped with a cargo eye adapted to be received by said cargo hook, said device comprising an elongated track located externally of said aircraft and extending generally longitudinally thereof from said cargo hook to a forward position within the field of vision of the pilot, a trolley body mounted on said track for guided movement longitudinally thereof any having two laterally spaced side walls, biasing means for urging said trolley body toward the forward end of said track, a U-shaped probe arranged with its open end facing rearwardly and having the rear ends of its arms pivotally connected respectively with said two side walls for movement of said probe about a transverse pivot axis between a generally horizontal position and a downwardly extending position, and means for biasing said probe to said horizontal position relative to said trolley body, said probe being adapted for insertion through said cargo eye as said aircraft is flown forwardly relative thereto and for thereafter holding said cargo eye to said trolley body so as to guide the same rearwardly to said cargo hook as a result of continued forward flight of said aircraft.

3. An in-flight cargo pick-up device for use with an aircraft having an external cargo hook or the like and with a cargo bundle equipped with a cargo eye adapted to be received by said cargo hook, said device comprising an elongated track located externally of said aircraft and extending generally longitudinally thereof from said cargo hook to a forward position within the field of vision of the pilot, said track being channel-shaped in cross section and having a longitudinally extending passageway therein defined in part by two opposed laterally inwardly extending bottom flanges spaced apart from each other to define a bottom opening in said track, a pair of laterally spaced guide members on said cargo eye adapted to enter said passageway as said aircraft is flown forwardly relative thereto and to thereafter be engageable with said bottom flanges so as to be retained in said passageway and guided longitudinally of said track as a result of continued forward movement of said aircraft.

4. An in-flight cargo pick-up device as defined in claim 3 further characterized by said laterally spaced guide members on said cargo eye comprising a pair of laterally spaced wheels.

5. An in-flight cargo pick-up device for use with an aircraft having an external cargo hook or the like and with a cargo bundle equipped with a cargo eye adapted to be received by said cargo hook, said device comprising an elongated track located externally of said aircraft and extending generally longitudinally thereof from said cargo hook to a forward position within the field of vision of the pilot, said track being channel-shaped in cross section and having a longitudinally extending passageway therein defined in part by two opposed laterally inwardly extending bottom flanges spaced apart from each other to define a bottom opening in said track, a pair of members pivotally secured to said cargo eye for movement between first and second positions relative to said cargo eye and each of which members includes a portion extending generally upwardly from its pivot axis and another portion extending generally downwardly from said pivot axis, two guide wheels each rotatably secured to a respective one of said upwardly extending portions and which wheels when said members are in their first positions are adapted to enter said passageway as said aircraft is flown forwardly relative thereto and to thereafter be engageable with said bottom flanges so as to be retained in said passageway and guided longitudinally of said track as a result of continued forward movement of said aircraft, and two magnets fixed to said cargo eye and each arranged to attract and engage a respective one of said downwardly extending portions to magnetically hold said members in their first positions, said wheels, members, and magnets being so arranged that a downward force applied by said wheels to said track tends to urge said members to their second positions in opposition to the attractive force of said magnets, and said wheels when said members are moved to their second positions being so arranged as to be capable of passing through said bottom opening.

6. A cargo pick-up device for securing a cargo bundle or the like to an external cargo hook of an aircraft while the latter is in flight, said device comprising a cargo eye, means including two normally vertical relatively telescoping members for supporting said cargo eye above said cargo bundle, one of said relatively telescoping members being connected with said cargo eye, means for attaching the other of said relatively telescoping members to said cargo bundle which means is effective to resiliently hold said members in their normal vertical attitude and to permit the same to tilt relatively to said cargo bundle in such a manner as to allow lateral or forward and downward movement of said cargo eye, means for limiting the upward movement of said cargo eye relative to said cargo bundle and for transferring any lifting force applied to said cargo eye to said cargo bundle after the upward limit of the cargo eye movement is reached, means including an elongated track suspended externally beneath said aircraft and extending forwardly from said cargo hook to a position within the field of vision of the pilot for initially engaging said cargo eye while it is visible to the pilot and for thereafter guiding the same rearwardly to said cargo hook as said aircraft is flown forwardly relative thereto, and guide means on the forward end of said track for engaging said cargo eye and for moving the same laterally relative to said cargo bundle to bring the said eye into alignment with said track as said aircraft is flown forwardly relatively thereto and before said eye reaches the forward end of said track.

7. A cargo pick-up device as defined in claim 6 further characterized by means associated with said relatively telescoping members for effecting a given angular relationship between said members when said cargo eye is in its lowermost position whereby said cargo eye is returned to its initial position relative to said cargo bundle in the event of an unsuccessful attempt at a pick-up.

8. A target adapted for attachment to a cargo bundle or the like and for use in attaching said cargo bundle to an external cargo hook of an aircraft while the latter is in flight, said target comprising a cargo eye, means including two normally vertical relatively telescoping members for supporting said cargo eye above said cargo bundle, one of said relatively telescoping members being connected with said cargo eye, means for attaching the other of said relatively telescoping members to said cargo bundle which means is effective to resiliently hold said members in their normal vertical attitude and to permit the same to tilt relatively to said cargo bundle in such a manner as to allow lateral or forward and downward movement of said cargo eye, and means for limiting the upward movement of said cargo eye relative to said cargo bundle and for transferring any lifting force applied to said cargo eye to said cargo bundle after the upward limit of the cargo eye movement is reached.

9. A target as set forth in claim 8 further characterized by means associated with said relatively telescoping members for effecting a given angular relationship between said members when said cargo eye is in its lowermost position whereby said cargo eye is returned to its initial position relative to said cargo bundle in the event of an unsuccessful attempt at a pick-up.

10. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, guide means engageable with said target and with said track for guiding said target longitudinally of said track and into said cargo hook as said aircraft moves forwardly relative to said cargo bundle, and two forwardly diverging guide members attached to the forward end of said track for facilitating initial engagement between said target, said track and said guide means as said aircraft is flown forwardly relative to said cargo bundle.

11. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, guide means engageable with said target and with said track for guiding said target longitudinally of said track and into said cargo hook as said aircraft moves forwardly relative to said cargo bundle, and said guide means including means for automatically releasing said target from guided relationship with said track in the event said target imposes a downward force on said track greater than a predetermined value.

12. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, guide means engageable with said target and with said track for guiding said target longitudinally of said track and into said cargo hook as said aircraft moves forwardly relative to said cargo bundle, and means including a part mounted on the forward end of said track and visible to the pilot for providing a visual indication as to the position of said target relative to said track.

13. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, guide means engageable with said target and with said track for guiding said target longitudinally of said track and into said cargo hook as said aircraft moves forwardly relative to said cargo bundle, two pulleys located one at either end of said track, a cable passed over said two pulleys to form an elongated loop having two sides each extending substantially the full length of said track and a forward portion of one of said loop sides being visible to the pilot, a carriage connected with one side of said cable loop, and means for biasing said cable in such a direction as to urge said carriage toward the forward end of said track, said carriage including a part engageable with said guide means for moving said carriage rearwardly along said track in unison with said guide means, said cable having informative markings along its length whereby the pilot by observing said forward portion of one of said loop sides may determine the position of said carriage and said guide means relative to said track.

14. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, guide means engageable with said target and with said track for guiding said target longitudinally of said track and into said cargo hook as said aircraft moves forwardly relative to said cargo bundle, and two pulleys located one at either end of said track, a cable passed over said two pulleys to form an elongated loop having two sides each extending substantially the full length of said track, a carriage connected with one side of said cable loop, a drum rotatably supported at the forward end of said track and having said cable wound therearound for at least one turn, and a bias spring associated with said drum tending to turn the latter in such a direction as to cause said cable to urge said carriage toward the forward end of said track, said drum being located so as to be visible to the pilot and said cable having informative markings along its length whereby the pilot by observing the portion of the cable wound on said drum may determine the position of said carriage and said guide means relative to said track.

15. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, and guide means engageable with said target and with said track for guiding said target longitudinally of said track and into said cargo hook as said aircraft moves forwardly relative to said cargo bundle, said guide means engageable with said track and with said target comprising a trolley mounted on said track for movement longitudinally thereof and biased toward the forward end of said track, said trolley including means for effecting engagement with said target as said aircraft is flown forwardly and for thereafter holding said target to said trolley as the aircraft continues in its forward flight whereby said target is guided longitudinally of said aircraft to said cargo hook.

16. An in-flight cargo pick-up device for use with an aircraft having an external cargo hook or the like and with a cargo bundle equipped with a target adapted to be received by said cargo hook, said device comprising an elongated track located externally of said aircraft and extending generally longitudinally thereof from said cargo hook to a forward position within the field of vision of the pilot, and guide means engageable with said target and with said track for guiding said target longitudinally of said track and into said cargo hook as said aircraft moves forwardly relative to said cargo bundle, said guide means engageable with said track and with said target comprising guide members mounted on said target and adapted to engage the forward end of said track as said aircraft is flown forwardly and to thereafter hold said target to said track for guided longitudinal movement relative thereto whereby said target is guided longitudinally of said aircraft to said cargo hook as a result of continued forward flight of said aircraft.

17. An in-flight cargo pick-up device as defined in claim 16 further characterized by means mounting said guide members to said target for movement relative to said target between first and second positions, said guide members in said first positions being engageable with said track for guided movement longitudinally thereof and in said second positions being incapable of so engaging said track, and means for normally holding said guide members in said first positions and for releasing the same for movement to said second positions in the event the downward load applied by said guide members to said track exceeds a predetermined value.

18. An inflight cargo pick-up device as defined in claim 17 further characterized by said last-mentioned means including magnets associated with said guide members for normally holding the latter in their first positions.

19. A cargo pick-up device for securing a cargo bundle or the like to an aircraft while the latter is in flight, said device comprising a target adapted for attachment to a cargo bundle and including an eye attached to the upper end of an elongated column, a cargo hook located at a position substantially fixed relative to said aircraft and out of the field of vision of the pilot, and means including an elongated track suspended externally beneath said aircraft and extending forwardly from said cargo hook to a position within the field of vision of the pilot for initially engaging said target while it is visable to the pilot and for thereafter captively guiding said target rearwardly to said cargo hook as said aircraft is flown forwardly relative thereto.

20. A cargo pick-up device as defined in claim 19 further characterized by said target also including means for normally holding said column in a generally vertical position relative to said cargo bundle and for permitting resilient forward tilting movement of said column as a result of a forwardly directed force applied to its upper end.

References Cited by the Examiner

UNITED STATES PATENTS

| | | |
|---|---|---|
| 2,193,312 | 3/1940 | Cobham et al. |
| 2,488,538 | 11/1949 | Hoehn et al. _____ 258—1.2 |
| 3,068,034 | 12/1962 | Campbell _____ 258—1.2 |

MILTON BUCHLER, *Primary Examiner.*

LOUIS J. DEMBO, FERGUS S. MIDDLETON,
*Examiners.*